(12) United States Patent
Peretti

(10) Patent No.: US 8,566,586 B2
(45) Date of Patent: *Oct. 22, 2013

(54) METHODS AND SYSTEMS FOR NETWORK-BASED MANAGEMENT OF APPLICATION SECURITY

(75) Inventor: Marco Peretti, Luxembourg (LU)

(73) Assignee: BeyondTrust Corporation, San Diego, CA (US)

( * ) Notice: Subject to any disclaimer, the term of this patent is extended or adjusted under 35 U.S.C. 154(b) by 33 days.

This patent is subject to a terminal disclaimer.

(21) Appl. No.: 13/207,338

(22) Filed: Aug. 10, 2011

(65) Prior Publication Data

US 2011/0296502 A1   Dec. 1, 2011

Related U.S. Application Data

(63) Continuation of application No. 11/206,376, filed on Aug. 18, 2005, now Pat. No. 8,006,088.

(51) Int. Cl.
*H04L 29/06* (2006.01)

(52) U.S. Cl.
USPC ........... 713/167; 713/164; 713/165; 713/166; 726/1; 726/4; 726/7; 726/17; 726/20; 726/21

(58) Field of Classification Search
USPC ........................................................ 713/167
See application file for complete search history.

(56) References Cited

U.S. PATENT DOCUMENTS

| | | | |
|---|---|---|---|
| 6,237,144 B1 | 5/2001 | Delo | |
| 6,308,274 B1 | 10/2001 | Swift | |
| 6,345,386 B1 | 2/2002 | Delo et al. | |
| 6,389,499 B1 | 5/2002 | Frank, Jr. et al. | |
| 6,389,589 B1 | 5/2002 | Mishra et al. | |
| 6,397,381 B1 | 5/2002 | Delo et al. | |
| 6,412,070 B1 | 6/2002 | Van Dyke et al. | |
| 6,418,554 B1 | 7/2002 | Delo et al. | |
| 6,466,932 B1 | 10/2002 | Dennis et al. | |
| 6,836,794 B1 | 12/2004 | Lucovsky et al. | |
| 7,146,638 B2 | 12/2006 | Malcolm | |
| 7,330,712 B2 | 2/2008 | Kirkup et al. | |
| 7,350,204 B2 * | 3/2008 | Lambert et al. | ............... 717/172 |

(Continued)

OTHER PUBLICATIONS

Dirk Balfanz and Daniel R. Simon. "WindowBox: A Simple Security Model for the Connected Desktop." 4th USENIX Windows Systems Symposium Paper 2000, pp. 37-48.*

(Continued)

*Primary Examiner* — Taghi Arani
*Assistant Examiner* — Narciso Victoria
(74) *Attorney, Agent, or Firm* — Sheppard, Mullin, Richter & Hampton LLP

(57) ABSTRACT

To control privileges and access to resources on a per-process basis, an administrator creates a rule that may be applied to modify a process's token. The rule includes an application-criterion set and changes to be made to the groups and/or privileges of a token. The rule is set as a policy within a group policy object (GPO), where a GPO is associated with one or more groups of computers. When a GPO containing a rule is applied to a computer, a driver installed on the computer accesses the rule(s) anytime a logged-on user executes a process. If the executed process satisfies the criterion set of a rule the changes contained within the rule are made to the process token, and the user has expanded and/or contracted access and/or privileges for only that process.

25 Claims, 17 Drawing Sheets

(56) References Cited

U.S. PATENT DOCUMENTS

| | | | |
|---|---|---|---|
| 7,398,532 B1 * | 7/2008 | Barber et al. | 719/328 |
| 7,673,323 B1 * | 3/2010 | Moriconi | 726/1 |
| 8,006,088 B2 | 8/2011 | Peretti | |
| 2002/0095671 A1 | 7/2002 | Delo et al. | |
| 2003/0023587 A1 | 1/2003 | Dennis et al. | |
| 2003/0145317 A1 | 7/2003 | Chamberlain et al. | |
| 2006/0248585 A1 | 11/2006 | Ward et al. | |
| 2007/0043943 A1 | 2/2007 | Peretti | |

OTHER PUBLICATIONS

NeoExec for Active Directory Administrators' Guide, Version 1.0, Aug. 2004.
NeoExec for Active Directory Administrators' Guide, Version 1.1, Sep. 2004.
PolicyMaker™ Software Update, 2003.
PolicyMaker™ Features and Advantages, Maximize ROI by Managing with Standards.

* cited by examiner

Token [primary]: [S-1-5-21-2025429265-1935655697-725345543-1004] (WXP\user, user)
Source: User32 9b☐ - ID 0-36239
Statistics:   ID: 0-6aca4
              AuthID: 0-3623d
              Modified ID: 0-6aca6
              Dynamic Charge: 1f4 bytes - 198 bytes free
              Session Id: 0
Owner: [S-1-5-21-2025429265-1935655697-725345543-1004] (WXP\user, user)
Primary Group: [S-1-5-21-2025429265-1935655697-725345543-513] (WXP\None, group)
acl, 2 ACEs, 0 bytes extra space
  ace: type 0x00, flags: 0x00, inheritance: 0x00, mask: 0x10000000, sid: [S-1-5-21-2025429265-1935655697-725345543-1004] (WXP\user, user)
  ace: type 0x00, flags: 0x00, inheritance: 0x00, mask: 0x10000000, sid: [S-1-5-18] (NT AU-THORITY\SYSTEM)

Groups in token [6]:
  [S-1-5-21-2025429265-1935655697-725345543-513]
      SE_GROUP_MANDATORY
      SE_GROUP_ENABLED_BY_DEFAULT
      SE_GROUP_ENABLED
  [S-1-1-0]
      SE_GROUP_MANDATORY
      SE_GROUP_ENABLED_BY_DEFAULT
      SE_GROUP_ENABLED
  [S-1-5-32-545]
      SE_GROUP_MANDATORY
      SE_GROUP_ENABLED_BY_DEFAULT
      SE_GROUP_ENABLED
  [S-1-5-5-0-221640]
      SE_GROUP_MANDATORY
      SE_GROUP_ENABLED_BY_DEFAULT
      SE_GROUP_ENABLED
  [S-1-2-0]
      SE_GROUP_MANDATORY
      SE_GROUP_ENABLED_BY_DEFAULT
      SE_GROUP_ENABLED
  [S-1-5-4]
      SE_GROUP_MANDATORY
      SE_GROUP_ENABLED_BY_DEFAULT
      SE_GROUP_ENABLED Restricted SIDs:
Token Privileges:
Privilege: 17, SeChangeNotifyPrivilege (Bypass traverse checking), state: enabled
Privilege: 13, SeShutdownPrivilege (Shut down the system), state: disabled
  Privilege: 19, SeUndockPrivilege (Remove computer from docking station), state: enabled

FIG. 1

METHODS AND SYSTEMS FOR NETWORK-BASED MANAGEMENT OF APPLICATION SECURITY

CROSS-REFERENCE TO RELATED APPLICATION

The present application is a continuation and claims the benefit of U.S. patent application Ser. No. 11/206,376 filed Aug. 18, 2005 now U.S. Pat. No. 8,006,088, entitled "Methods and Systems for Network-Based Management of Application Security" which is incorporated by reference herein.

BACKGROUND

1. Field of the Invention

The disclosed methods and systems related generally to securing resources and privileges on a computer, and more particularly to controlling access to resources and controlling privileges on a per-process basis.

2. Description of Related Art

A user logs on to a computer locally by giving his user name and password to the operating system ("OS"). The operating system then creates a logon session and an access token for that user. The access token includes a unique identifier, known as a security ID ("SID") for the logged-on user, the list of privileges the user has or the user's groups have, and a list of all the groups that the user, as identified by his/her unique SID, belongs to. Note that each group is also identified by a unique SID. For each process that is created during the logon session, the OS assigns a copy of the original access token to that process. An example of a process token is shown in FIG. 1.

A user's membership in different groups determines what securable objects, such as a file, process, event, or anything else having a security descriptor, the user is able to access, presuming the object allows members of that group access. Thus, if access to a particular object, such as a file, is limited to only members of a group with SID 54321, and a user is not a member of that group, the user is not able to access that object. Similarly, a user's privileges are limited to those identified in the access token.

Whenever a process tries to access a securable object, the OS performs an access check. The operating system compares the token of the process to the access control list ("ACL") of the object. An access control list is a list of security protections that applies to an object. An entry in an ACL is known as an access control entry ("ACE"). An ACE contains a set of access rights, such as read/write, etc., and a SID that identifies a group and/or user for whom the rights are allowed, denied, or audited. If a SID in the process token is in the ACL of the object, and within the ACE of that SID, rights are set to "allow", then the process associated with the process token is able to access the object. Otherwise, the process is denied access to the object. Access to the object may also be denied, even if the process token contains a SID that is in the object's ACL if, for example, within the ACE of that SID, rights are set to deny. Also, some privileges instruct the operating system to bypass an object's ACL. Under such a security arrangement, each process created by the operating system in response to a given process's request therefore has the same token as the requesting process, and thus shares the same access to securable objects and privileges.

However, situations may arise where, in order to perform a required task, a user needs access to secured objects and/or privileges that are outside the scope of his current group membership and/or privileges listed in his access token. One solution to this problem is to make the user a member of a group that has expanded access and/or privileges, such as the Administrators group in a Windows-brand OS. This solution may have unintended consequences, as the user gains not only the needed access and/or privilege(s), but further access and other privileges as well. Making the user a member of the Administrators group enables him to access the particular needed object, but may also enable him to install unauthorized applications, perform unauthorized modifications to the configuration of their computer, and so on. Potentially even more important, users with elevated privileges and access are more vulnerable to viruses, trojans, malware, etc. Thus, a means of granting only needed access and/or privileges is desirable.

In WINDOWS® a Group Policy Object (GPO) is a collection or grouping of configuration settings that are applied to computer users and/or computers/systems automatically and/or remotely. Group Policy is a MICROSOFT® implementation of the general concept of policy-based management, which is a computer management model. One potential implementation of a group policy system is described in U.S. Pat. No. 6,466,932. By applying the configuration settings to the computers/systems, a system administrator or other entity may define and/or set the behavior and/or "appearance"/configuration of the computers/users. Accordingly, a GPO is generally configured by a system administrator or other high-level administrator, and as an object, a GPO can be associated with a hierarchical grouping known as a "container." A container may be a domain, a site, an organization unit (OU), or other association of computers/systems/users. In some example instances, a GPO may define script options, security options, software-installation options, folder-redirection options, software-maintenance options, and other configuration options.

Each GPO has a list that controls whether the GPO's settings are applied to given users, groups, and/or computers. An entity that is on the list has the GPO's settings applied to it. An entity not on the list does not, at least in response to that GPO. The use of groups, as opposed to user- or computer-identities, as the criterion on which the settings-application decision is made may be referred to as GPO-level filtering. Accordingly, GPO-level filtering allows a system administrator or another to specify whether a GPO is applied or denied to users/computers. The GPO is thus applied in its entirety, or denied in its entirety, to a user/computer/system.

In a MICROSOFT® WINDOWS® implementation, GPOs are populated with settings by a Group Policy Object Editor (GPOE). Settings are applied on client computers by corresponding extensions, called Client-Side Extensions (CSEs). There is a documented extension model that MICROSOFT® provides for software vendors to extend these systems and, by doing so, provide new functionality within the WINDOWS® Group Policy architecture.

SUMMARY OF THE INVENTION

In a first embodiment, there is provided, for modifying access to securable objects, a method including: providing a rule that includes an application-criterion set including at least one criterion for token modification in accordance with the rule, the rule specifying at least one group to be added to a token of a process that satisfies the application-criterion set and whose access to securable objects is controlled by an operating system in accordance with the token, at least one said specified group being a group other than the Administrators group; and before the operating system employs a process's token to determine that process's access to securable objects: making a determination of whether that process satisfies the criterion set; and if and only if that determination is affirmative, adding to that process's token in response to that rule each group that the rule specifies.

In a related embodiment, there the rule may be one of a plurality of such rules; the method may include assigning relative priorities to the rules; and the method may include adding a group to the process's token in response to a given rule only if the process satisfies the application-criterion set of no rule whose priority is higher than the given rule's. In another related embodiment, the process may execute an executable entity; and at least one said criterion may be that the executable entity match an executable-entity identifier specified by that criterion. In a further related embodiment, the executable entity may be an executable file. In still another further embodiment, the executable-entity identifier may be a hash on the executable file's contents. In yet another further related embodiment, the executable-entity identifier may represent the executable file's path.

In another related embodiment, the rule may further specify at least one privilege to be added to the token of a process that satisfies the application-criterion set; and the method may further include adding each privilege that the rule specifies to a process's token if the process satisfies the application-criterion set.

In yet another related embodiment, the rule may further include an inheritance option set to either block or allow inheritance, by any child process, of any group or groups added to the token of a parent process; and if the inheritance option is set to block and the process does not satisfy any said rule's application-criterion set, the method may further include determining if the process is the child of another process and if the process is the grandchild of another process, and if both determinations are affirmative, make that process's token the same as the token of its grandparent process, and if not, make that process's token the same as an unmodified access token.

In yet another related embodiment, one said criterion may be that the user match a user identifier specified by that criterion.

In another embodiment, there is provided, for modifying a user's privileges to perform systems-related operations, a method including: providing a rule that includes an application-criterion set including at least one criterion for token modification in accordance with the rule, the rule specifying at least one privilege to be added to a token of a process that satisfies the application-criterion set and whose performance of system operations is controlled by an operating system in accordance with the token; and before the operating system employs a process's token to determine that process's privileges: making a determination of whether that process satisfies the criterion set; and if and only if that determination is affirmative, adding to that process's token in response to that rule each privilege that the rule specifies.

In a related embodiment, the rule may be one of a plurality of such rules; the method may include assigning relative priorities to the rules; and the method may include adding a privilege to the process's token in response to a given rule only if the process satisfies the application-criterion set of no rule whose priority is higher than the given rule's. In another related embodiment, the process may execute an executable entity; and at least one said criterion may be that the executable entity match an executable-entity identifier specified by that criterion.

In yet another related embodiment, the rule may further specify at least one group to be added to the token of a process that satisfies the application-criterion set; and the method may further include adding each group that the rule specifies to a process's token if the process satisfies the application-criterion set.

In yet another related embodiment, the rule may further include an inheritance option set to either block or allow inheritance, by any child process, of any privilege or privileges added to the token of a parent process; and if the inheritance option is set to block and the process does not satisfy any said rule's application-criterion set, the method may further include determining if the process is the child of another process and if the process is the grandchild of another process, and if both determinations are affirmative, make that process's token the same as the token of its grandparent process, and if not, make that process's token the same as an unmodified access token.

In still yet another related embodiment, one said criterion may be that the user match a user identifier specified by that criterion.

In another embodiment, there is provided, for blocking inheritance of a modified token of a process, a method including: providing at least one rule that includes an application-criterion set including at least one criterion for token modification in accordance with the rule, the rule specifying (1) at least one change to be made to a token of a process that satisfies the application-criterion set and whose privileges and access to securable objects are controlled by an operating system in accordance with the token, and (2) an inheritance option set to either block or allow inheritance, by any child process, of any changes made to the token of a parent process; and if the inheritance option is set to block and the process does not satisfy any said rule's application-criterion set, before the operating system of the computer employs a process's token to determine that process's privileges and access to securable objects, determining if the process is the child of another process and if the process is the grandchild of another process, and if both determinations are affirmative, make that process's token the same as the token of its grandparent process, and if not, make that process's token the same as an unmodified access token.

In another embodiment, there is provided, for limiting changes made to a token of a process, a method including: providing a rule that includes an application-criterion set including at least one criterion for token modification in accordance with the rule, wherein one said criterion is that the user match a user identifier specified by that criterion, the rule specifying at least one change to be made to a token of a process that satisfies the application-criterion set and whose access to securable objects and privileges is controlled by an operating system in accordance with the token; and before the operating system employs a process's token to determine that process's access to securable objects and privileges: making a determination of whether that process satisfies the criterion set; and if and only if that determination is affirmative, changing that process's token in response to that rule according to each change that the rule specifies.

In a related embodiment, the at least one change may be one of adding a group, removing a group, adding a privilege, and removing a privilege. In another related embodiment, the rule may be one of a plurality of such rules; the method may include assigning relative priorities to the rules; and the method may include changing the process's token in response to a given rule only if the process satisfies the application-criterion set of no rule whose priority is higher than the given rule's. In yet another related embodiment, the process may execute an executable entity; and at least one said criterion may further include that the executable entity match an executable-entity identifier specified by that criterion.

In still another related embodiment, the rule may further include an inheritance option set to either block or allow inheritance, by any child process, of any changes made to the token of a parent process; and if the inheritance option is set to block and the process does not satisfy any said rule's application-criterion set, the method may further include determining if the process is the child of another process and if the process is the grandchild of another process, and if both determinations are affirmative, make that process's token the same as the token of its grandparent process, and if not, make that process's token the same as an unmodified access token.

In another embodiment, there is provided for managing, over a network, changes to process tokens created in computers operatively coupled to the network, where the computers on the network are organized into groups, a method including: creating a rule that includes an application-criterion set including at least one criterion for token modification in accordance with the rule, the rule specifying at least one change to be made to a token of a process that satisfies the application-criterion set and whose access to securable objects and privileges is controlled by an operating system in accordance with the token; associating each created rule to respective selected ones of group policy objects, where at least one selected group policy object applies to at least one of the groups of computers; applying each group policy object to its group of computers; and for each computer in each group, before the operating system of that computer employs a process's token to determine that process's access to securable objects and privileges: making a determination of whether that process satisfies the criterion set; and if and only if that determination is affirmative, changing that process's token in response to that rule according to each change that the rule specifies.

In a related embodiment, the at least one change may be one of adding a group, removing a group, adding a privilege, and removing a privilege. In another related embodiment, the rule may be one of a plurality of such rules; the method may include assigning relative priorities to the rules; and the method may include changing the process's token in response to a given rule only if the process satisfies the application-criterion set of no rule whose priority is higher than the given rule's. In yet another related embodiment, the process may execute an executable entity; and at least one said criterion may further include that the executable entity match an executable-entity identifier specified by that criterion.

In still another related embodiment, the rule may further include an inheritance option set to either block or allow inheritance, by any child process, of any changes made to the token of a parent process; and if the inheritance option is set to block and the process does not satisfy any said rule's application-criterion set, the method may further comprise determining if the process is the child of another process and if the process is the grandchild of another process, and if both determinations are affirmative, make that process's token the same as the token of its grandparent process, and if not, make that process's token the same as an unmodified access token.

In yet still another related embodiment, one said criterion may be that the user match a user identifier specified by that criterion. In still yet another related embodiment, the method may further include adding, in response to user input, at least one user-defined filter criterion to a selected group policy object. In a further related embodiment, applying each group policy object to its group of computers may further include applying each group policy object to each computer in its associated group of computers if that computer satisfies the user-defined filter criterion. In another further related embodiment, the at least one user-defined criterion may include at least one user identifier.

In another embodiment, there is provided a computer program product to modify access to securable objects on a computer, the computer program product including computer code to: receive a rule that includes an application-criterion set including at least one criterion for token modification in accordance with the rule, the rule specifying at least one group to be added to a token of a process that satisfies the application-criterion set and whose access to securable objects is controlled by an operating system of the computer in accordance with the token, at least one said specified group being a group other than the Administrators group; and before the operating system of the computer employs a process's token to determine that process's access to securable objects: make a determination of whether that process satisfies the criterion set; and if and only if that determination is affirmative, add to that process's token in response to that rule each group that the rule specifies.

In another embodiment, there is provided a computer program product to modify a user's privileges to perform systems-related operations on a computer, the computer program product comprising computer code to: receive a rule that includes an application-criterion set including at least one criterion for token modification in accordance with the rule, the rule specifying at least one privilege to be added to a token of a process that satisfies the application-criterion set and whose performance of system operations is controlled by an operating system of the computer in accordance with the token; and before the operating system of the computer employs a process's token to determine that process's privileges: make a determination of whether that process satisfies the criterion set; and if and only if that determination is affirmative, add to that process's token in response to that rule each privilege that the rule specifies.

In another embodiment, there is provided a computer program product to block inheritance of a modified token of a process on a computer, the computer program product comprising computer code to: receive at least one rule that includes an application-criterion set including at least one criterion for token modification in accordance with the rule, the rule specifying (1) at least one change to be made to a token of a process that satisfies the application-criterion set and whose privileges and access to securable objects are controlled by an operating system of the computer in accordance with the token, and (2) an inheritance option set to either block or allow inheritance, by any child process, of any changes made to the token of a parent process; and if the inheritance option is set to block and the process does not satisfy any said rule's application-criterion set, before the operating system of the computer employs a process's token to determine that process's privileges and access to securable objects, determine if the process is the child of another process and if the process is the grandchild of another process, and if both determinations are affirmative, make that process's token the same as the token of its grandparent process, and if not, make that process's token the same as an unmodified access token.

In another embodiment, there is provided a computer program product to limit changes made to a token of a process on a computer, the computer program product comprising computer code to: receive a rule that includes an application-criterion set including at least one criterion for token modification in accordance with the rule, wherein one said criterion is that the user match a user identifier specified by that criterion, the rule specifying at least one change to be made to a token of a process that satisfies the application-criterion set and whose access to securable objects and privileges is controlled by an operating system in accordance with the token; and before the operating system employs a process's token to determine that process's access to securable objects and privileges: making a determination of whether that process satisfies the criterion set; and if and only if that determination is affirmative, changing that process's token in response to that rule according to each change that the rule specifies.

In another embodiment, there is provided a computer program product to manage, over a network, changes to process tokens created in computers operatively coupled to the network, where the computers on the network are organized into groups, the computer program product comprising computer code to: create a rule that includes an application-criterion set including at least one criterion for token modification in accordance with the rule, the rule specifying at least one change to be made to a token of a process that satisfies the application-criterion set and whose access to securable objects and privileges is controlled by an operating system in accordance with the token; associate each created rule to respective selected ones of group policy objects, where at least one selected group policy object applies to at least one of the groups of computers; apply each group policy object to its group of computers; and for each computer in each group, before the operating system of that computer employs a process's token to determine that process's access to securable objects and privileges: make a determination of whether that process satisfies the criterion set; and if and only if that determination is affirmative, change that process's token in response to that rule according to each change that the rule specifies.

BRIEF DESCRIPTION OF THE DRAWINGS

The invention description below refers to the accompanying drawings, of which:

FIG. 1 is an example of the contents of a process token;

FIG. 12 shows an unmodified process token containing a user's SID and the SIDs of the group that user is a member of.

DETAILED DESCRIPTION OF THE INVENTION

To provide an overall understanding, certain illustrative embodiments will now be described; however, it will be understood by one of ordinary skill in the art that the systems and methods described herein may be adapted and modified to provide systems and methods for other suitable applications and that other additions and modifications may be made without departing from the scope of the systems and methods described herein.

Unless otherwise specified, the illustrated embodiments may be understood as providing exemplary features of varying detail of certain embodiments, and therefore, unless otherwise specified, features, components, modules, and/or aspects of the illustrations may be otherwise combined, separated, interchanged, and/or rearranged without departing from the disclosed systems or methods. Additionally, the shapes and sizes of components are also exemplary and unless otherwise specified, may be altered without affecting the scope of the disclosed and exemplary systems or methods of the present disclosure.

The embodiments of the invention as described below allow an administrator of a computer network to set privileges and access to securable objects on a per-process basis, thereby creating a more secure, manageable environment. Some embodiments may use a group/policy management system, where WINDOWS® GPO management is provided herein as an example of such a policy management system. However, the disclosed methods and systems are not limited to such an example embodiment, and may be understood to apply to other group and/or policy-based management systems and techniques.

Figure 2:
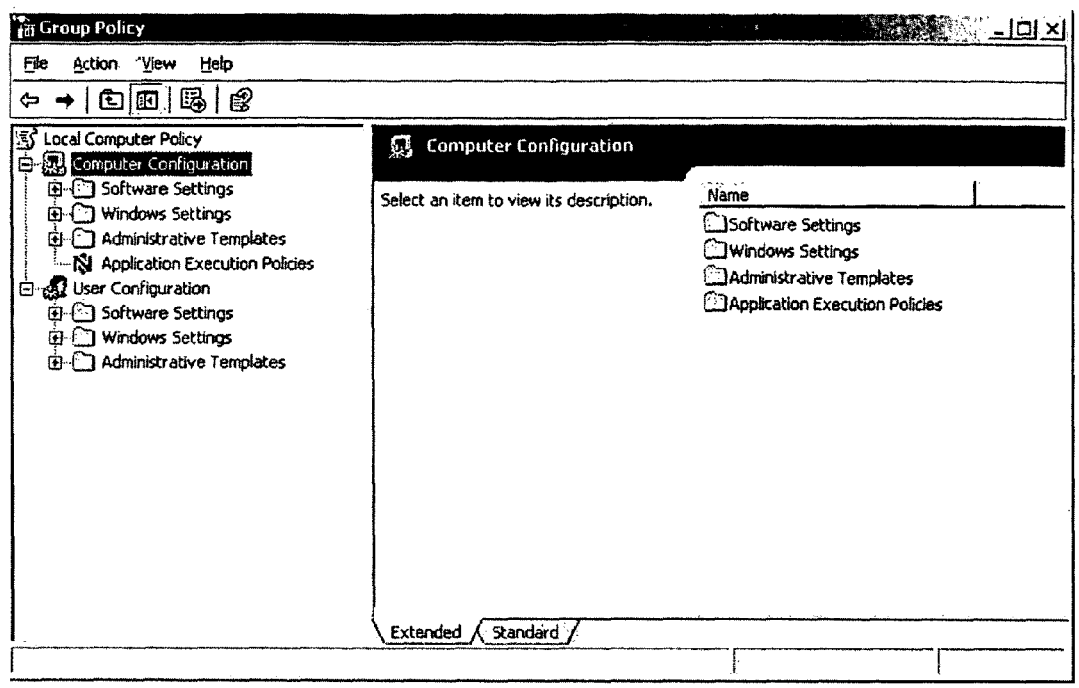
FIG. 2 is a graphical user interface of the security management system described herein, through which rules may be created, edited, and/or deleted.
Figure 3:
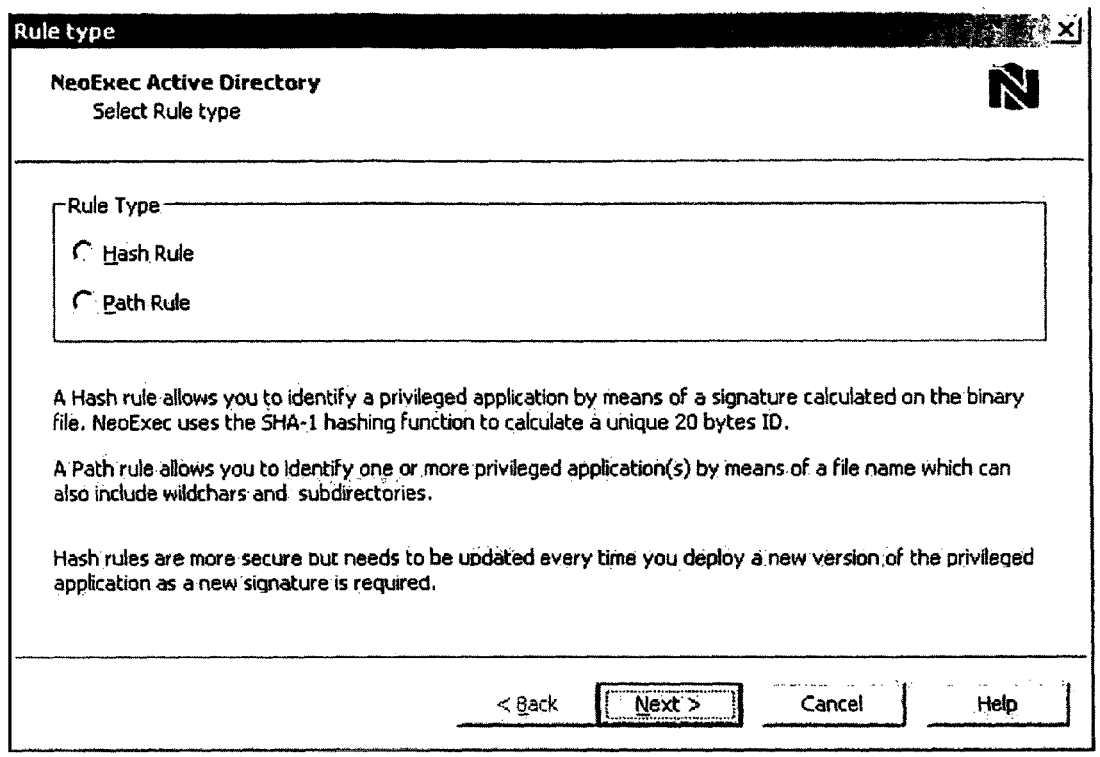
FIG. 3 is a graphical user interface for selecting the type of rule.

FIG. 2 shows a graphical user interface of the security management system described herein. Before creating a rule or rules to be used in modifying process tokens, the administrator or other user must select a policy object to add policies to, remove policies from, or modify the existing policies of. Then, the user creates a rule or rules that a local computer uses to modify the token of a process, or edits or deletes one or more existing rules. A rule identifies at least one process to be applied to, but may identify any number of processes. The user selects one of two options for identifying a process, either by a hash rule or a path rule, as shown in FIG. 3. A hash rule uses a hashing function, such as but not limited to the SHA-1 hashing function, to calculate a unique identifier of the process; the calculation is performed on the binary file of the process. In a preferred embodiment, the identifier is a 20 byte ID, though any size identifier may be used. The hash rule is independent of the file location, but the rule must be updated whenever a new image of the file is deployed. A hash rule may be applied to only one executable file at the time.

Alternatively, a path rule allows the user to identify one or more processes by means of a file name and/or path, which may include wildcards, keywords, and/or subdirectories. A path rule is ideal when the rule applies to a number of processes that are subject to frequent changes and that execute code stored in a location under the control of the user, such as but not limited to a network share.

Figure 4A:
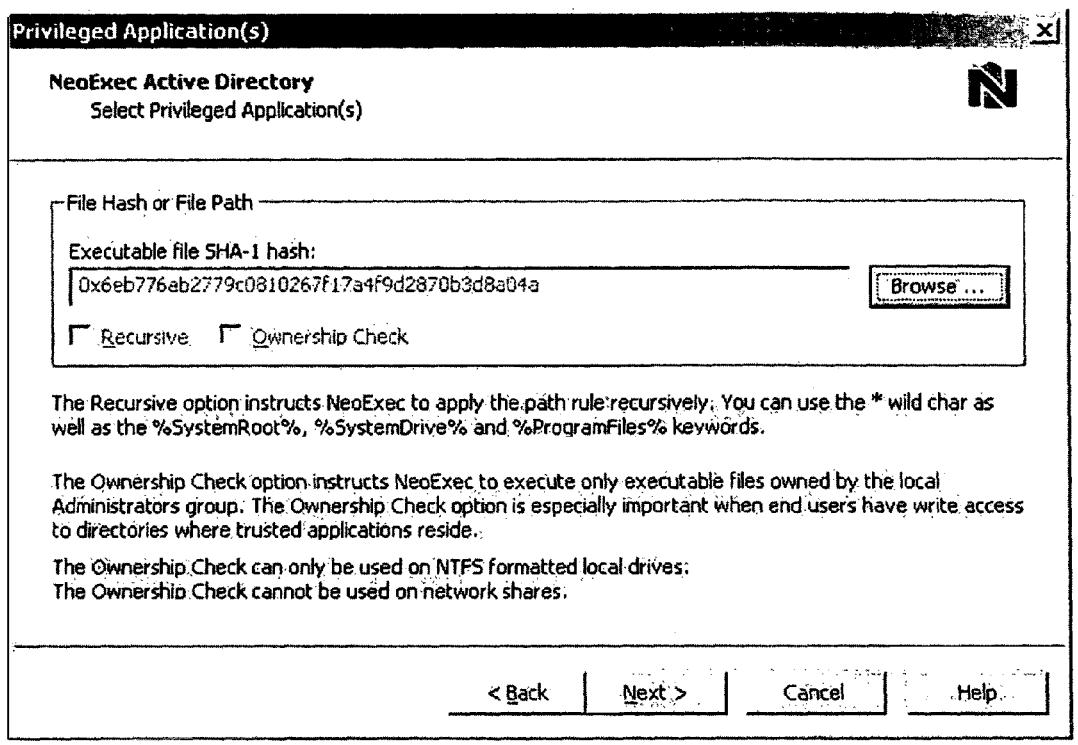
FIGS. 4A and 4B are respective graphical user interfaces for selecting processes to which a rule applies, according to type of rule chosen.
Figure 4B:
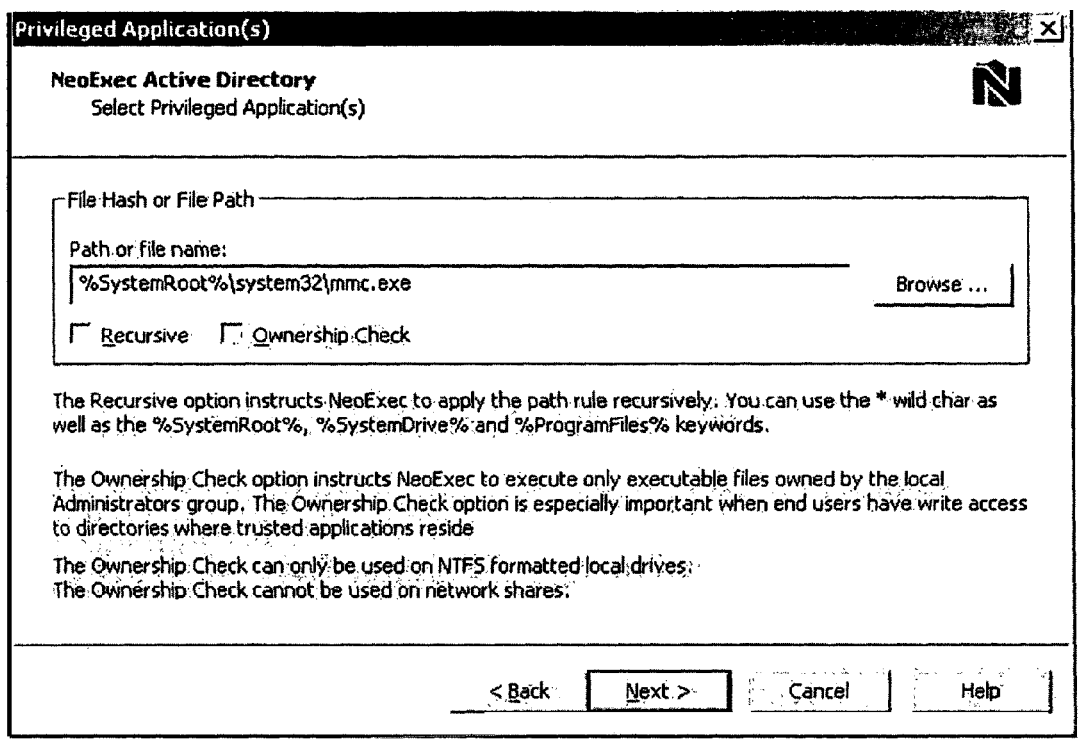

After the rule type is chosen, the processes that the rule will apply to are chosen. One or more processes may be chosen, as shown in the graphical user interfaces of FIGS. 4A and 4B. For the path rule, it is possible to have the rule apply recursively by selecting the "Recursive" option, as shown in FIG. 4B.

Figure 5:
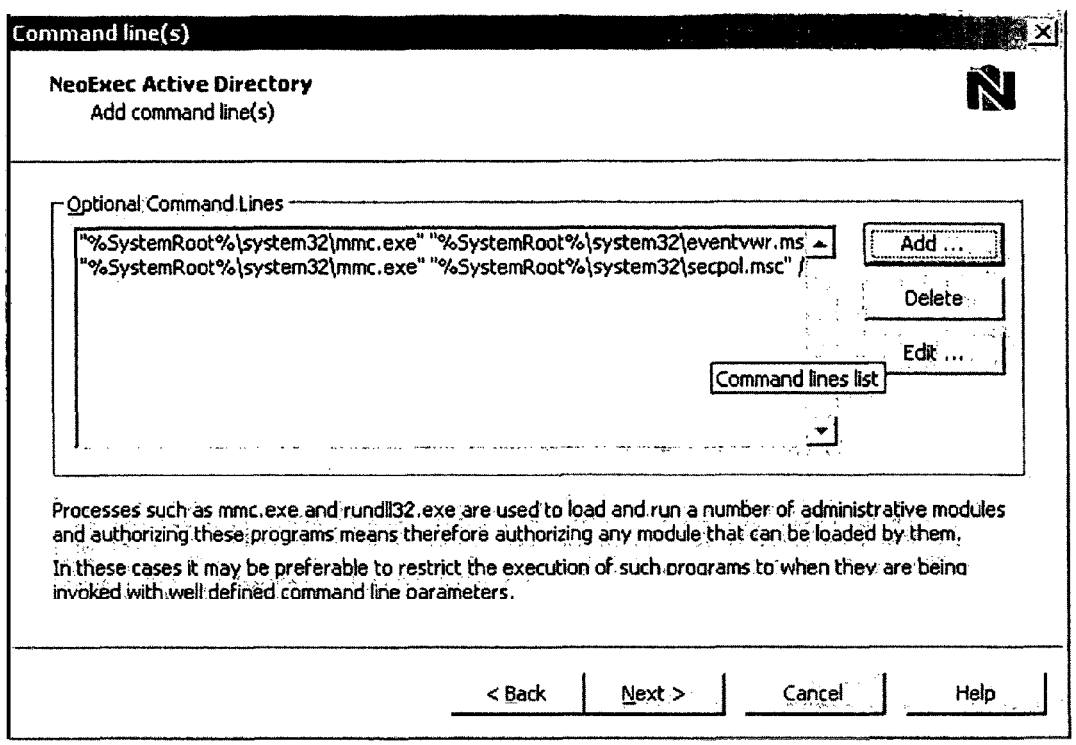
FIG. 5 is a graphical user interface for optionally limiting a rule to apply only if a particular command line of a process is used.

As an option, the user may wish to restrict the execution of certain processes so that they may be launched only if a specific command line argument is used. For example, in a Windows-based OS, all Control Panel applets are either .cpl extensions executed by rundll32 or shortcuts to administrative Microsoft Management Console snap-ins executed by mmc.exe. As it is potentially unsafe to grant end users unrestricted access to those applications, the execution of such processes may be limited to occur only when invoked with particular command line arguments. After being selected, particular command lines may be added, deleted, or edited, as shown in FIG. 5.

Figure 6:
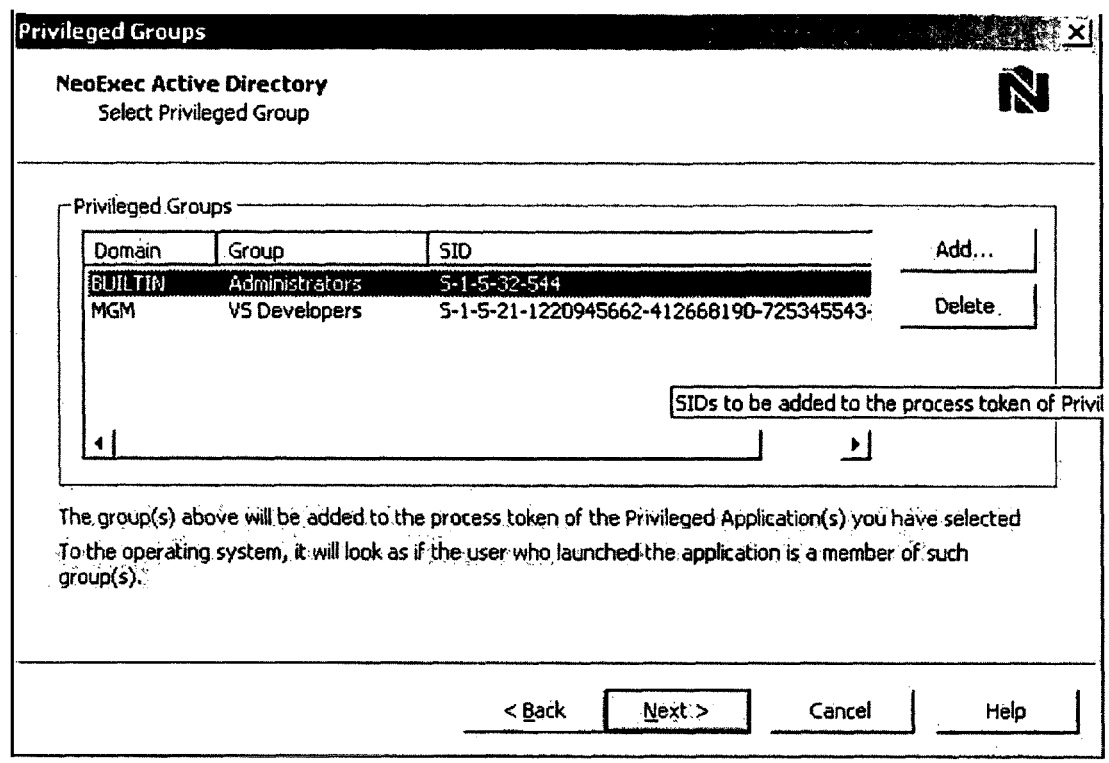
FIG. 6 is a graphical user interface for adding one or more groups to the rule.
Figure 7:
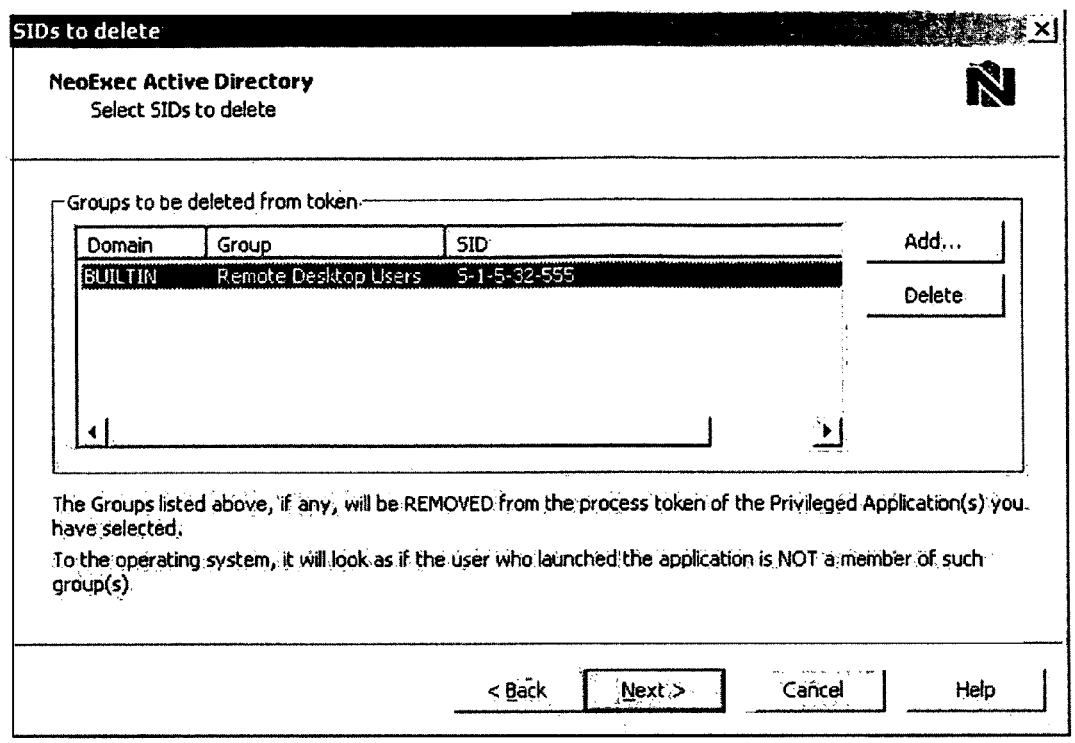
FIG. 7 is a graphical user interface for removing one or more groups from the rule.
Figure 8:
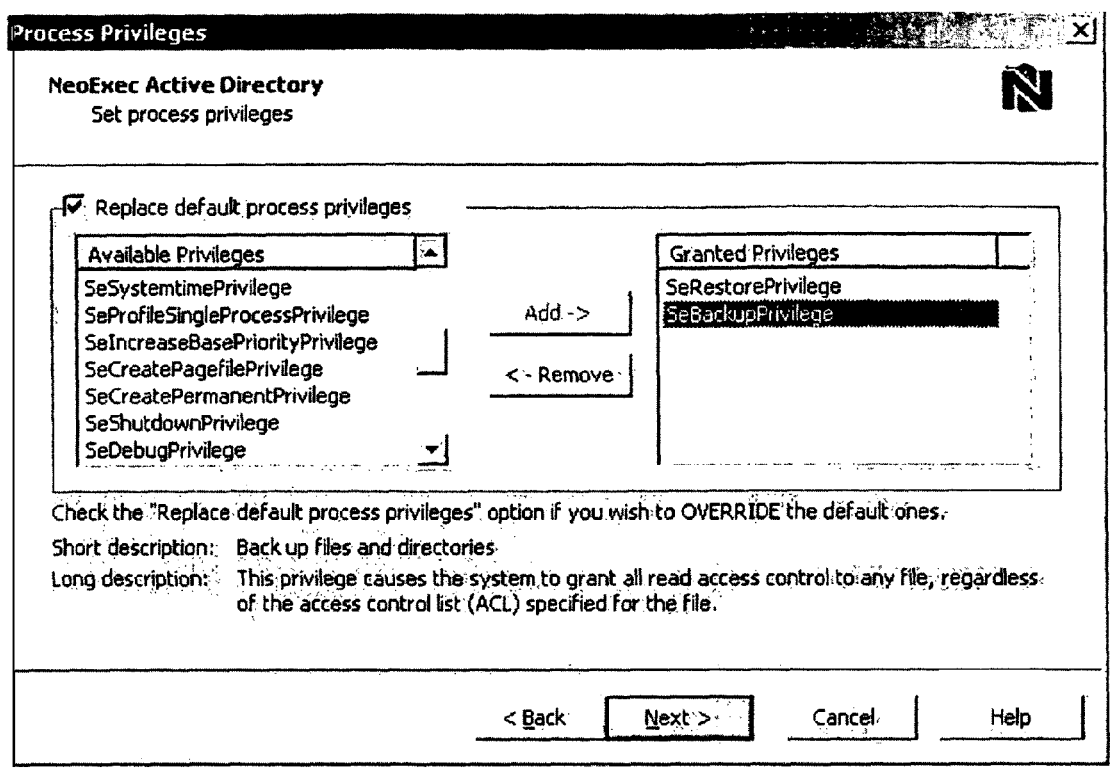
FIG. 8 is a graphical user interface for adding and/or removing one or more privileges from the rule.

The administrator or other user then selects what change or changes the rule will make to each identified process's token. A change may be one or more of: adding a group or groups to the token, by the use of the graphical user interface shown in FIG. 6; removing a group or groups from the token, by the use of the graphical user interface shown in FIG. 7; adding a privilege or privileges to the token; and removing a privilege or privileges from the token, both by use of the graphical user interface shown in FIG. 8.

Figure 9:
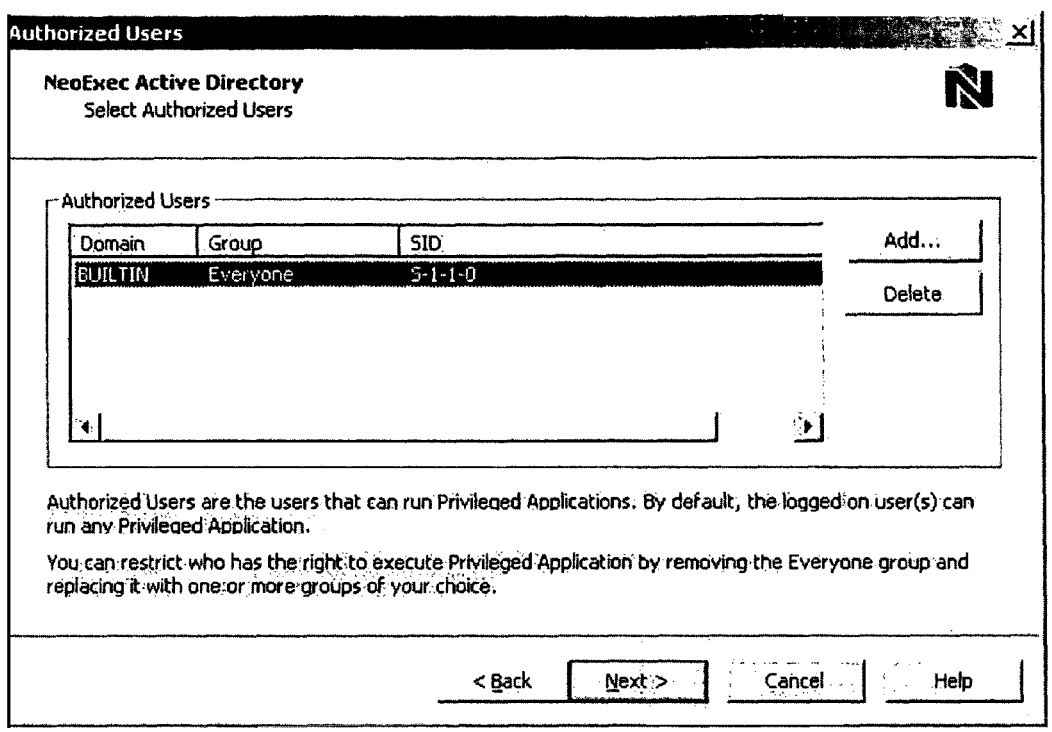
FIG. 9 is a graphical user interface for optionally limiting application of the rule to specified users.

The administrator or other user may optionally identify a particular user or users in the rule, for example by indicating a particular group as shown in the graphical user interface of FIG. 9. This option will restrict application of the rule to only those identified users. As is explained further below, this option may serve as a filter criterion at the policy level, or as a filter criterion each time a process is executed on a computer. By default, this option is turned on and identifies all users through, for example but not limited to, the Everyone group.

Additionally, a rule may also include an option to block or allow inheritance, by a child process, of the token of the corresponding parent process, which may have been modified from the original access token. If the option is set to allow, a child process inherits the potentially modified token of its parent process. If the option is set to block, and the parent process is itself a child process, the child process receives the token of its grandparent; otherwise, the child process receives the original, unmodified access token created when the user initially logged on to the computer.

As described above, after a rule has been created, it is associated with one or more selected group policy objects as a policy. It is possible for an administrator or other user to include a user-defined criterion/criteria as a filtering scheme that may be added to any policy. Such user-defined criteria may be added after the policy corresponding to a rule has been added to the policy object. In a preferred embodiment, there is provided a point-and-click filter graphical user interface, as shown in FIG. 10, that facilitates a drag and drop of user-defined filter criteria within a single user-defined filter control, a drag and drop of user-defined filter elements between filter controls from other policies, a standardized per filter naming and documentation capability, a generalized automatic generation of environment variable with filter results, standardized tracing, event logging and reporting, standardized Boolean operators (and/or/not) applied to filters, indefinite level of nesting to graphically represent logical parenthetic expressions, integration with Windows environment variables (read/write), an ability to generate environment variables for use in follow-on filters or configurations, and a hidden filter capability that allows configuration items to transparently leverage the filter system without presenting those generated filters to administrators.

Figure 10:
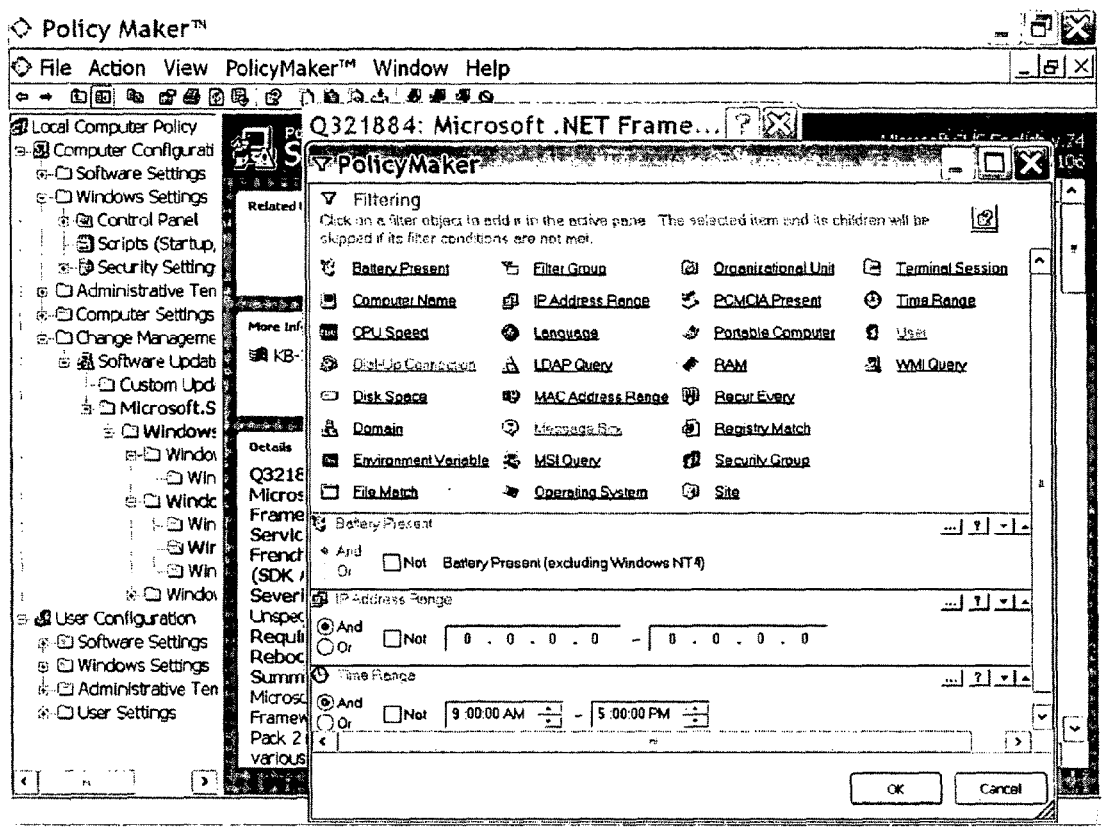
FIG. 10 a filter graphical user interface, showing options available for adding administrator-defined filter criteria to a policy or policy object.
Figure 11A:
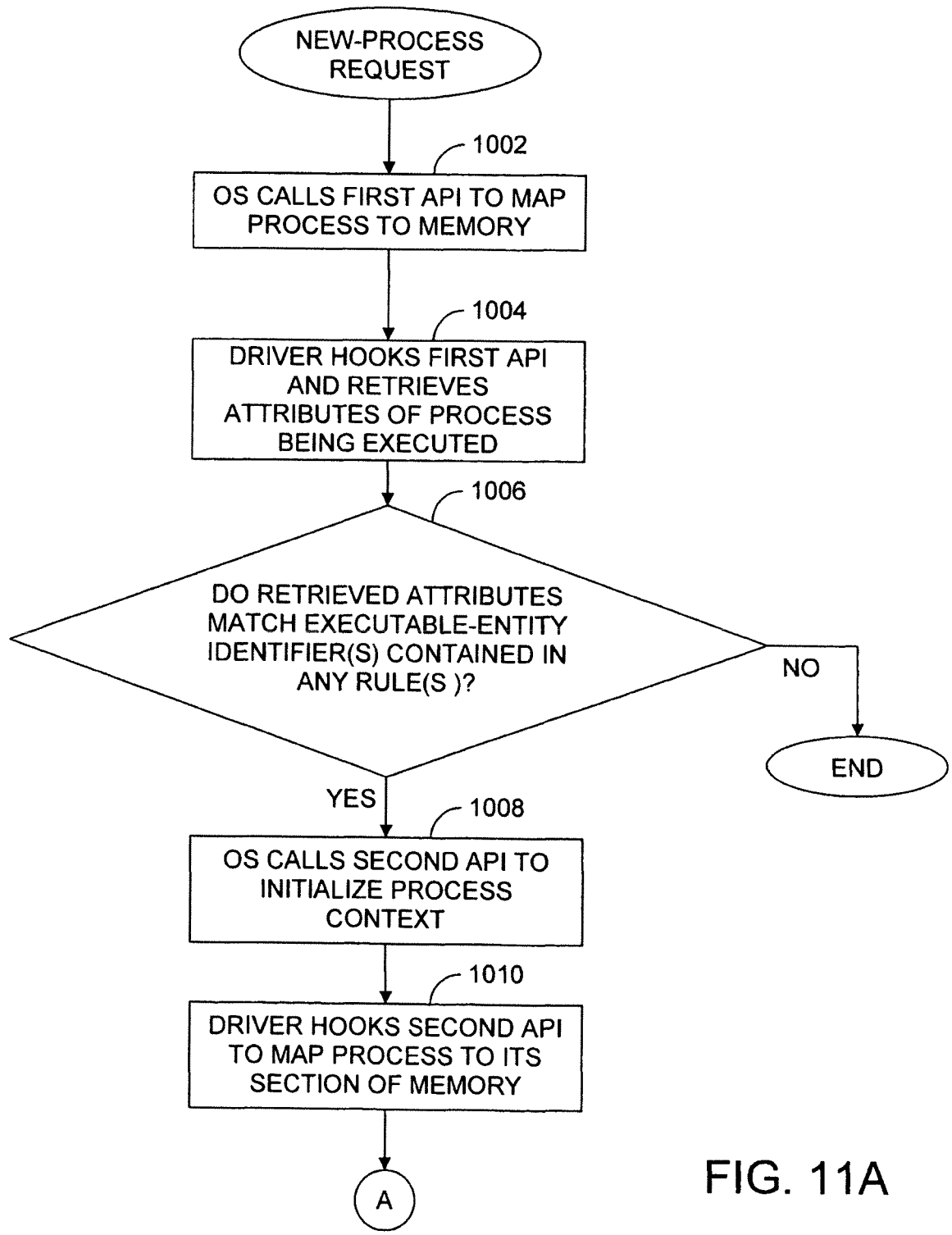
FIGS. 11A-11D are a flowchart showing how a local computer applies the rule(s) it receives as policies to processes as they execute on the local computer.
Figure 11B:
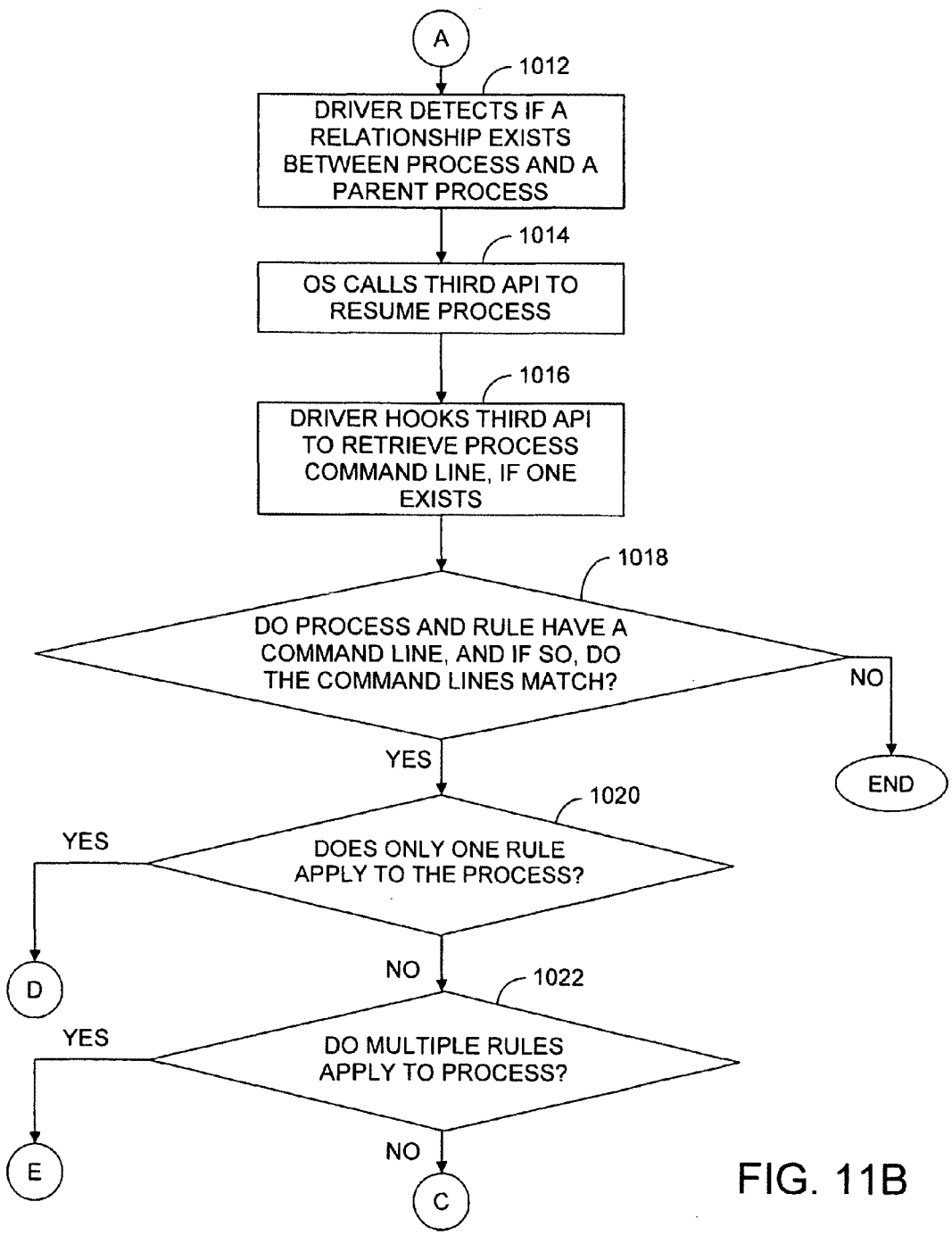
Figure 11C:
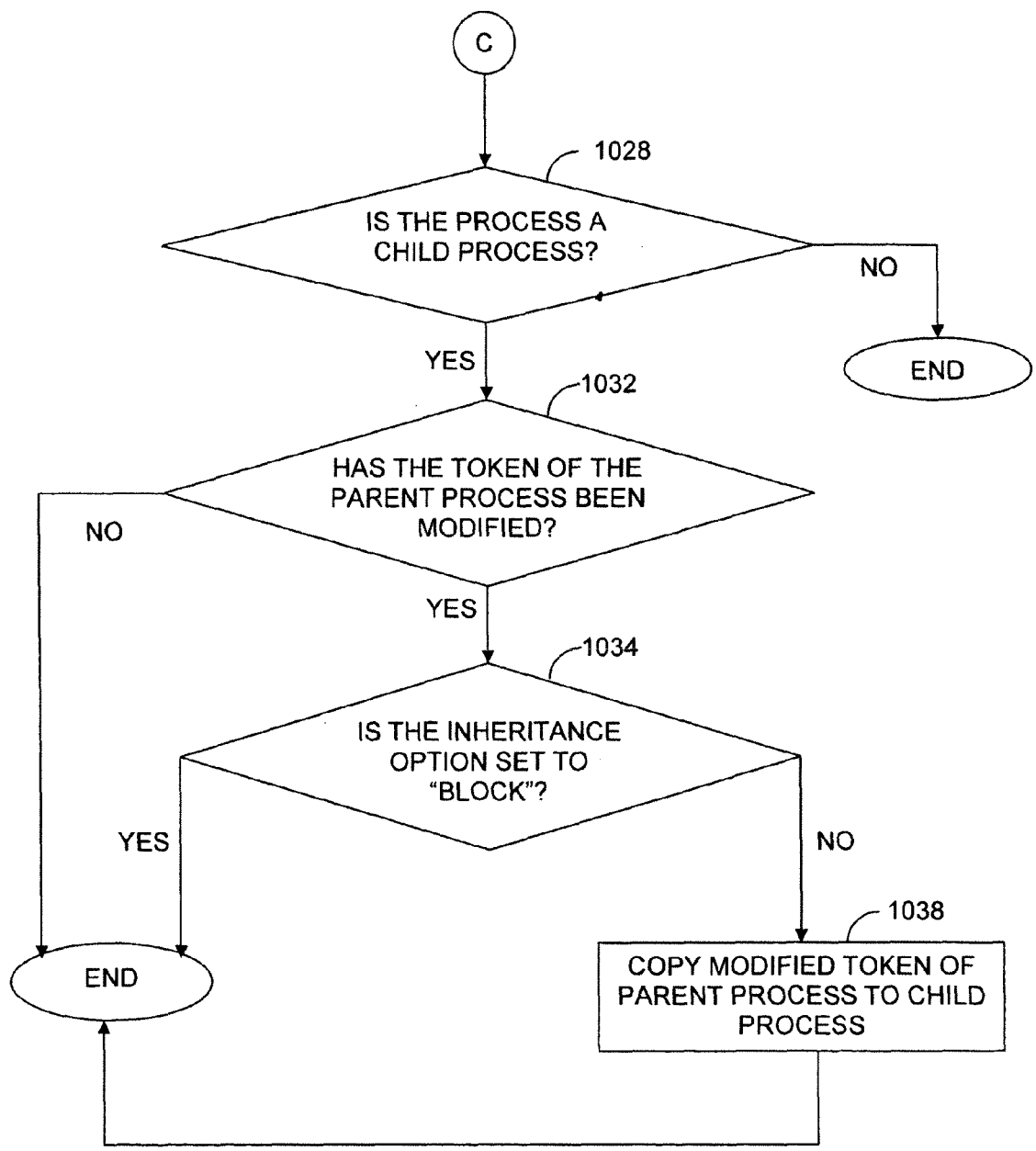
Figure 11D:
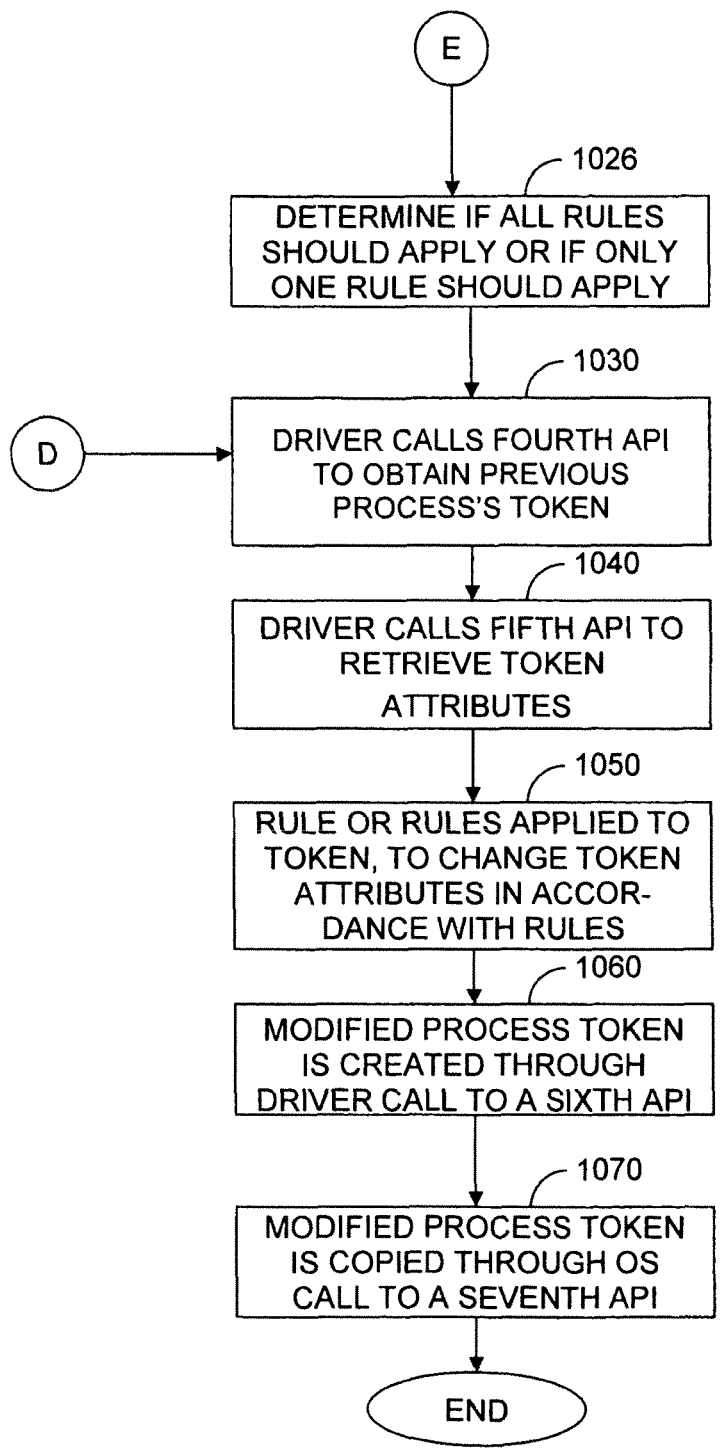

The filter graphical user interface of FIG. 10 facilitates the selection of filter criteria in a manner that allows a system administrator or other user to perform actions such as drag-and-drop to add/remove filter criteria from the policy. Some filter criteria may include, but are not limited to, Battery Present, Computer Name, CPU Present, Dial-Up Connection, Disk Space, Domain, Environment Variables, File match, Filter Group, IP Address Range, Language, LDAP Query, MAC Address Range, Message Box, MSI Query, Operating System, Organizational Unit, PCMCIA Present, Portable Computer, Processing Mode, RAM, Recur Every, Registry Match, Security Group, Site, Terminal Session, Time Range, User, and WMI Query. A filter criterion may have various settings depending on the filter criterion type. These filter settings may be modified by the administrator or other user. The user-defined filter criteria are associated with logic to allow for a determination of whether the policy should be applied to a given computer on the network.

As described above, policy objects may be associated with one or more directory containers. These directory containers, which may be domains, sites, or organizational units, are arranged hierarchically: a domain may include within it a plurality of sites, each of which in turn may include a plurality of organizational units. For example, within a company, a domain may encompass each computer that belongs to the company, a site may encompass all of the computers located on a particular floor of the company's building, and an organizational unit may encompass the computers of a particular group within the company, such as the engineering department. A policy object that is associated with each of those containers will have its policies applied to those containers when the policy objects are deployed by the policy management system.

The policy management system includes options to order the policy objects within a container and across containers. This allows an administrator to address the order in which policies from different policy objects are applied, and to address how conflicts between policy objects are resolved. Each directory container includes options, which may be set by the administrator, to enforce the policy objects associated with the container on the computers associated with the container, and to block the policy objects associated with containers that are lower in the hierarchy.

When the administrator has set the policy objects to reflect the settings to be applied to computers on the network, the policy management system prepares to apply the policies. Before a policy is applied to a computer associated with a directory container, any user-defined filter criteria contained in the policy must be run to determine if the computer satisfies the criteria. If the computer satisfies the filter criteria, the policy management system is able to apply the policy to the computer. In some embodiments of the current invention, application of a policy that corresponds to a rule causes the computer to apply the rule to any relevant process(es), as described below.

Additionally, if a rule includes a user identifier and the system is configured to use this as a per-policy filter criterion, the SID of the current user logged on to a computer, or any SID identifying the groups to which that user belongs, must match the user identifier in order for the policy to be applied to that computer. As is explained below, the system may alternatively be configured to use a user identifier as a filter that is applied whenever a process is executed on the computer.

To cause the operating system of a local computer to apply the rule or rules it receives, a driver is installed on the local computer. During installation, the driver registers with the OS, such that, when a process is being executed on the local computer, the OS informs the driver of this action.

As a result, when the local user then performs an action that causes the OS to execute a process, the routines described in the flowchart of FIGS. 11A-11D are executed. Before the process begins executing, that is, when the OS calls a first application programming interface ("API") (in Windows, ZwCreateSection system call) to map the file into memory 1002, the driver hooks the first API 1004. If the file being mapped into memory is an executable, as identified from the first API, the driver checks whether the process is subject to any rule(s) received as policies. To make this determination, the driver looks at a number of attributes, including but not limited to the full path of the file (including its name and location), the session information of the user, the file SHA-1 message digest (which is a unique 20 bytes identifier of the file), and the owner of the file. These attributes are compared with the identifier(s) of each process in the rules applied to the local computer 1006. If the retrieved attributes match the identifier of any process indicated in a rule, that rule is then applied to the process, as described below.

After the operating system loads the file image in memory, it will call a second API 1008, such as but not limited to ZwCreateProcess in Windows 2000 or ZwCreateProcessEx in Windows XP and Windows 2003, to initialize the process. The driver hooks this second API in order to map the process to the driver's section of memory 1010, where any rules that apply have been stored. Additionally, the driver detects if there is a relationship between the process and a parent process 1012, and then stores this relationship for later use, as is described below.

Once the process context has been created, the operating system will try to start the process by calling a third API to resume the process 1014, such as but not limited to ZwResumeThread, which the driver also hooks 1016. The driver then retrieves 1016 the process command line from the third API, if there is one. If the rule contains a command line argument 1018, it is compared against the command line used to start the process, and the rule will apply only if there is a match. If only one rule applies to the process 1020, the driver modifies the token of the process as described below.

If the process being resumed is subject 1022 to more than one rule, the driver may determine 1026 which rule(s) to apply. In a preferred embodiment, the driver applies all applicable rules to the process. Alternatively, a rule may be chosen to be applied according to a set priority scheme. One possible priority scheme is that user policies have precedence over machine policies, and for any given rule type, the rule with the highest GPO ID and Order applies. Next, the driver modifies the process token as described below.

If the process being resumed does not match 1024 any rule, the driver checks to see if the process is a child process 1028. If the process is a child process, the driver checks to see if the process token of a parent process, if any, has been modified 1032. If it has, and the inheritance option is set 1034 to "block", then the driver resets the token of the child process to equal the original unmodified access token of the logged-on user, or if the parent process is itself a child process, the driver resets the token of the child process to equal the token of its grandparent, which may contain changes. Otherwise, the child process receives a copy of the process token of the parent process 1038, which may contain changes.

While the embodiment as described above uses systems calls hooking, it is also possible to use callback functions provided by the operating system to achieve the same results. Examples of such callback functions include, but are not limited to, PsSetCreateProcessNotifyRoutine, PsSetCreateThreadNotifyRoutine, and PsSetLoadImageNotifyRoutine for a Windows-based OS.

To modify, or replace, a process token, the driver first obtains the current process token through a call 1030 to a fourth API that contains the current token, such as but not limited to ZwOpenProcessToken in a Windows-based OS. The different token attributes are retrieved by the driver calling 1040 a fifth API that contains the token attributes, such as but not limited to ZwQueryInformationToken in a Windows-based OS.

Token attributes may include, but are not limited to, TOKEN_GROUPS, TOKEN_STATISTICS, TOKEN_USER, TOKEN_PRIVILEGES, TOKEN_OWNER, TOKEN_PRIMARY_GROUP, TOKEN_DEFAULT_DACL, TOKEN_SOURCE, TOKEN_TYPE, and TOKEN_CONTROL data structures.

The TOKEN_USER structure identifies the user associated with the process token and is used when the policy to be applied is a User policy. For a User policy, the driver compares the policy's user SID, as determined at logon, with the content of the TOKEN_USER structure. If there is no match, the driver stops processing the rule. This comparison is required whenever the process has not been started by the currently logged-on user, for example but not limited to system services.

The driver will then apply the rule 1050, which may add one or more SIDs to TOKEN_GROUPS list and/or remove any one or more of the SIDs present in the TOKEN_GROUPS list, and/or add one or more privileges to the TOKEN_PRIVILEGES list and/or remove any one or more privileges from the TOKEN_PRIVILEGES list. Each time a token is modified, regardless of the modification(s) made, the driver also adds a group to keep track of the modification(s) made.

After the required TOKEN_xxx data structures are set, the modified process token is created 1060. The driver spawns a system thread and calls an sixth API to create the token, such as but not limited to ZwCreateToken. The system thread will execute under the LocalSystem context. After the token has been created, it is copied into the process by a call 1070 by the OS to a seventh API, such as but not limited to ZwSetInformationProcess.

When the process then executes, the local user is able to access objects within the process, and/or use privileges, according to the modified process token. When the process terminates, its token is deleted. The next time a process is created, a new token will be created for that process, according to the method described above, again starting with the access token that was created when the local user first logged on.

Figure 12:
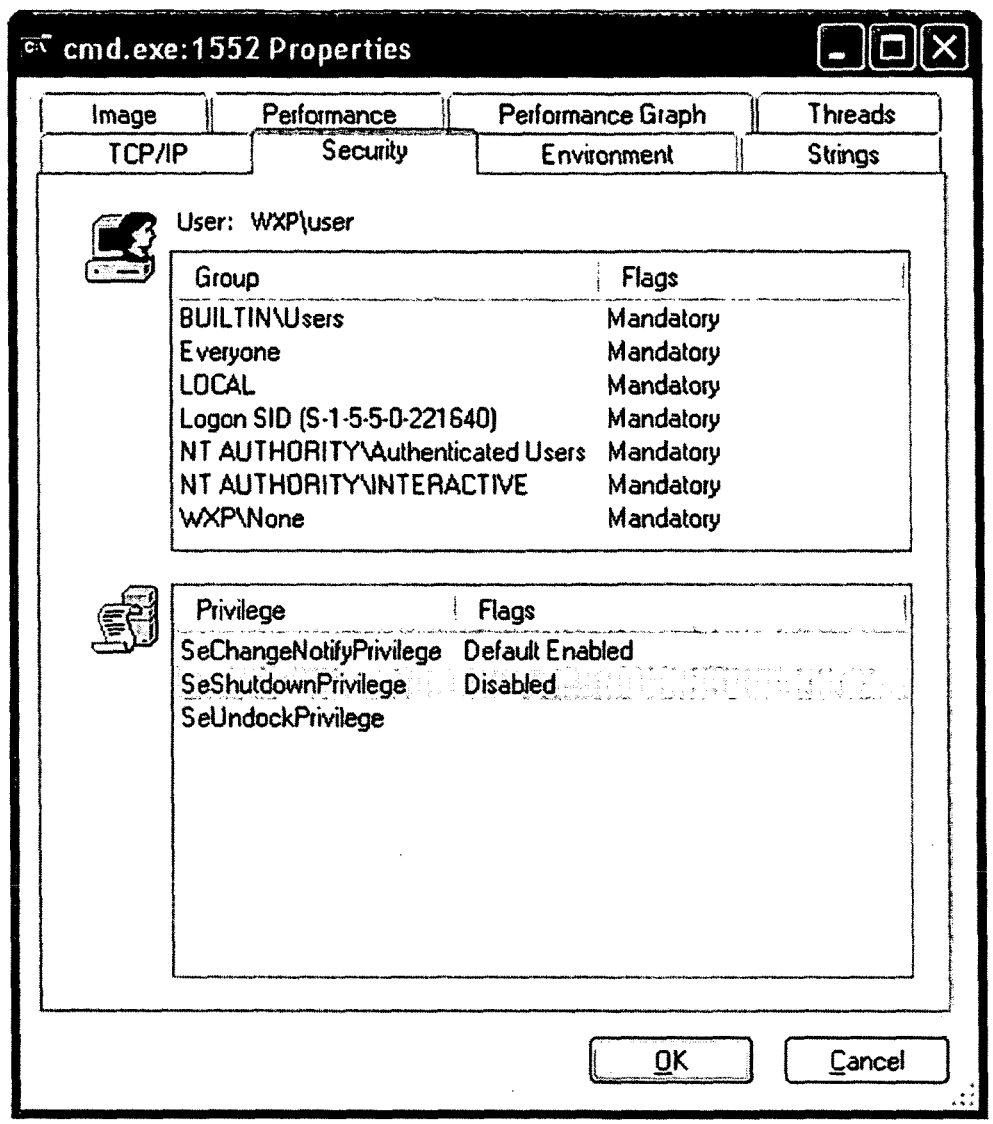
Figure 13:
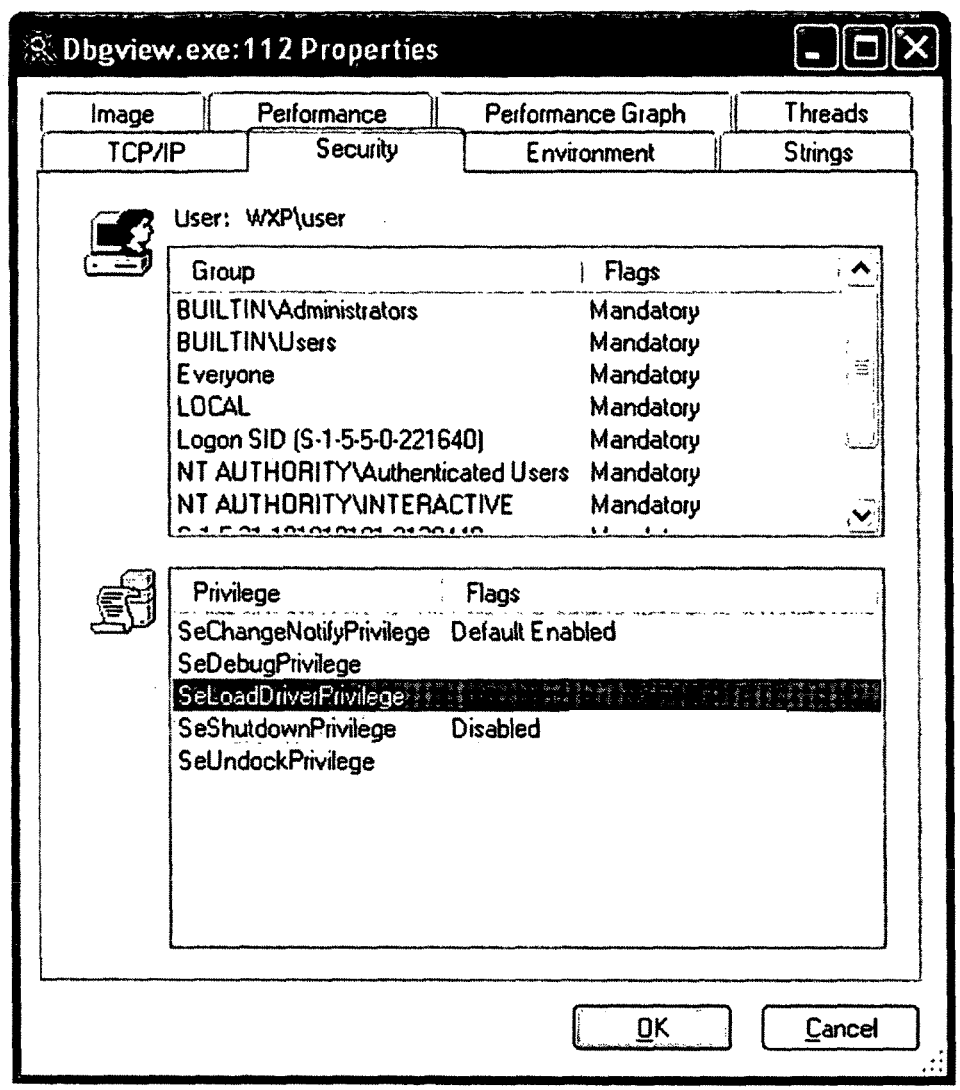
FIG. 13 shows the process token of FIG. 12 modified to include a new group and its corresponding SID.

An example of adding a group and two privileges to a process token is shown in FIGS. 12 and 13. In FIG. 12, an unmodified process token is shown. The token identifies the current user, the groups that user belongs to, and the privileges that user has. If this user wanted to run an application, such as DebugView, the user would not have sufficient group membership and privileges, as DebugView requires the user to be a member of the Administrators group and to have both the Debug Programs (SeDebugPrivilege) and Load and Unload Device Drivers (SeLoadDriverPrivilege) privileges. Thus, to allow the user to run the application, a rule is created that indicates that the Administrators group, and the requisite privileges, should be added to the process token for the process DebugView. This rule is then sent to the local machine via a group policy object and applied by the driver, both as described above. The resultant modified process token is shown in FIG. 13. The modified process token now contains the Administrators group, and the Debug Programs (SeDebugPrivilege) and Load and Unload Device Drivers (SeLoadDriverPrivilege) privileges.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single or multiple processor/devices.

The device(s) or computer systems that integrate with the processor(s) may include, for example, a personal computer(s), workstation (e.g., Sun, HP), personal digital assistant (PDA), handheld device such as cellular telephone, laptop, handheld, or another device capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus may be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the Internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" or "an" to modify a noun may be understood to be used for convenience and to include one, or more than one of the modified noun, unless otherwise specifically stated.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art. Accordingly, it will be understood that the disclosed methods and systems are not to be limited to the embodiments disclosed herein, may include practices otherwise than specifically described, and are to be interpreted as broadly as allowed under the law.

The invention claimed is:

1. A computer program product for modifying access to securable objects, the computer program product comprising program instructions stored on a non-transitory computer readable medium, the program instructions to be executed by a processor to perform a method, the method comprising:
   providing a rule that includes an application-criterion set including at least one criterion for modifying a token of a process during execution of the process in accordance with the rule, wherein the rule specifies at least one group to be added to the token of the process if the process satisfies the application-criterion set, wherein access to securable objects by the process is controlled by an operating system in accordance with the token, and wherein at least one said specified group is a group other than an Administrators group; and
   before the operating system employs the process's token to determine the process's access to securable objects:
   making a determination of whether the process satisfies the application-criterion set; and if and only if the determination is affirmative, adding to or removing from the process's token in response to the rule each group or user that the rule specifies.

2. The computer program product according to claim 1, wherein:
the rule is one of a plurality of rules;
the method further comprises assigning relative priorities to the plurality of rules; and
adding a group to the process's token in response to a given rule occurs only if the process satisfies the application-criterion set of no other rule whose priority is higher than a priority of the given rule.

3. The computer program product according to claim 1, wherein:
the process executes an executable entity; and
the at least one criterion is that the executable entity matches an executable-entity identifier specified by the at least one criterion.

4. The computer program product according to claim 3, wherein the executable entity is an executable file.

5. The computer program product according to claim 4, wherein the executable-entity identifier is a hash on the executable file's contents.

6. The computer program product according to claim 4, wherein the executable-entity identifier represents the executable file's path.

7. The computer program product according to claim 1, wherein:
the rule further specifies at least one privilege to be added to or removed from the token of the process that satisfies the application-criterion set; and
the method further comprises adding or removing each privilege that the rule specifies to a process's token if the process satisfies the application-criterion set.

8. The computer program product according to claim 1, wherein the at least one criterion is that a user match a user identifier specified by the at least one criterion.

9. A computer program product that modifies a user's privileges to perform system-related operations, the computer program product comprising program instructions stored on a non-transitory computer readable medium, the program instructions to be executed by a processor to perform a method, the method comprising:
providing a rule that includes an application-criterion set including at least one criterion for token modification in accordance with the rule, wherein the rule specifies at least one privilege to be added to a token of a process if the process satisfies the application-criterion set, and wherein performance of system operations by the process is controlled by an operating system in accordance with the token; and
before the operating system employs a process's token to determine the process's privileges:
making a determination of whether the process satisfies the application-criterion set; and
if and only if the determination is affirmative, adding to the process's token in response to the rule each privilege that the rule specifies.

10. The computer program product according to claim 9, wherein:
the rule is one of a plurality of rules;
the method further comprises assigning relative priorities to the plurality of rules; and
the method further comprises adding a privilege to the process's token in response to a given rule only if the process satisfies the application-criterion set of no other rule whose priority is higher than a priority of the given rule.

11. The computer program product according to claim 9, wherein:
the process executes an executable entity; and
the at least one application-criterion is that the executable entity match an executable-entity identifier specified by the at least one criterion.

12. The computer program product according to claim 9, wherein:
the rule further specifies at least one group to be added to or removed from the token of a process that satisfies the application-criterion set; and
the method further comprises adding each group that the rule specifies to a process's token if the process satisfies the application-criterion set.

13. The computer program product according to claim 9, wherein the at least one criterion is that the user match a user identifier specified by the at least one criterion.

14. A computer program product that limits changes made to a token of a process, the computer program product comprising program instructions stored on a non-transitory computer readable medium, the program instructions to be executed by a processor to perform a method, the method comprising:
providing a rule that includes an application-criterion set including at least one criterion for token modification in accordance with the rule, wherein the at least one criterion is that a user match a user identifier specified by the at least one criterion, wherein the rule specifies at least one change to be made to a token of a process if the process satisfies the application-criterion set, and wherein access to securable objects and privileges by the process is controlled by an operating system in accordance with the token; and
before the operating system employs a process's token to determine the process's access to securable objects and privileges:
making a determination of whether the process satisfies the application-criterion set; and
if and only if the determination is affirmative, changing the process's token in response to the rule according to each change that the rule specifies.

15. The computer program product according to claim 14, where the at least one change is one of adding a group, removing a group, adding a privilege, and removing a privilege.

16. The computer program product according to claim 14, wherein:
the rule is one of a plurality of rules;
the method further comprises assigning relative priorities to the plurality of rules; and
the method further comprises changing the process's token in response to a given rule only if the process satisfies the application-criterion set of no rule whose priority is higher than a priority of the given rule.

17. The computer program product according to claim 14, wherein:
the process executes an executable entity; and
the at least one criterion further includes that the executable entity match an executable-entity identifier specified by the at least one criterion.

18. A computer program product that manages, over a network, changes to process tokens created in computers operatively coupled to the network, the computer program product comprising program instructions stored on a non-transitory computer readable medium, the program instructions to be executed by a processor to perform a method, the method comprising:

creating a rule that includes an application-criterion set including at least one criterion for token modification in accordance with the rule, wherein the rule specifies at least one change to be made to a token of a process if the process satisfies the application-criterion set, and wherein access to securable objects and privileges by the process is controlled by an operating system in accordance with the token;

associating each created rule to respective selected ones of group policy objects, where at least one selected group policy object applies to at least one of a plurality of groups of computers or users;

applying each group policy object to its group of computers or users; and for each computer or user in each group, before the operating system of the each computer or user employs a process's token to determine the process's access to securable objects and privileges:

making a determination of whether the process satisfies the application-criterion set; and if and only if the determination is affirmative, changing the process's token in response to the rule according to each change that the rule specifies.

19. The computer program product according to claim 18, where the at least one change is one of adding a group, removing a group, adding a privilege, and removing a privilege.

20. The computer program product according to claim 18, wherein:

a plurality of rules are created;

the method further comprises assigning relative priorities to the plurality of rules; and the method further comprises changing the process's token in response to a given rule only if the process satisfies the application-criterion set of no other rule whose priority is higher than a priority of the given rule.

21. The computer program product according to claim 18, wherein:

the process executes an executable entity; and the at least one criterion further includes that the executable entity matches an executable-entity identifier specified by the at least one criterion.

22. The computer program product according to claim 18, wherein the at least one criterion is that a user match a user identifier specified by the at least one criterion.

23. The computer program product according to claim 18, further comprising:

adding, in response to user input, at least one user-defined filter criterion to a selected group policy object.

24. The computer program product according to claim 23, wherein applying each group policy object to its group of computers or users further comprises applying each group policy object to each computer or user in its associated group of computers or users if the computer or user satisfies the user-defined filter criterion.

25. The computer program product according to claim 24, wherein the at least one user-defined filter criterion includes at least one user identifier.

* * * * *